(12) United States Patent
Rubalewski et al.

(10) Patent No.: US 12,222,173 B2
(45) Date of Patent: Feb. 11, 2025

(54) HEAT-EXCHANGER PINS

(71) Applicant: Hamilton Sundstrand Corporation, Charlotte, NC (US)

(72) Inventors: Jaroslaw Rubalewski, Kwidzyn (PL); Hubert Siudzinski, Wroclaw (PL); Tomasz Meczkowski, Kielczow (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 308 days.

(21) Appl. No.: 17/704,054

(22) Filed: Mar. 25, 2022

(65) Prior Publication Data

US 2022/0307776 A1    Sep. 29, 2022

(30) Foreign Application Priority Data

Mar. 26, 2021    (EP) .................... 21461527

(51) Int. Cl.
| | |
|---|---|
| *F28F 3/02* | (2006.01) |
| *B22F 10/28* | (2021.01) |
| *B33Y 10/00* | (2015.01) |
| *B33Y 70/00* | (2020.01) |
| *B33Y 80/00* | (2015.01) |

(52) U.S. Cl.
CPC .............. *F28F 3/022* (2013.01); *B22F 10/28* (2021.01); *B33Y 10/00* (2014.12); *B33Y 70/00* (2014.12); *B33Y 80/00* (2014.12); *F28F 2215/10* (2013.01)

(58) Field of Classification Search
CPC ........ F28F 3/022; F28F 3/048; F28F 2215/10; F28F 2215/06; F28F 2215/08; F28F 2250/02; B22F 10/28; B33Y 70/00; B33Y 80/00; F28D 1/0341; F28D 1/035; F28D 1/0383; F28D 9/0037; F28D 9/0068
See application file for complete search history.

(56) References Cited

U.S. PATENT DOCUMENTS

| | | | | | |
|---|---|---|---|---|---|
| 2,595,457 | A | * | 5/1952 | Jensen | F28F 3/022 165/145 |
| 5,381,859 | A | * | 1/1995 | Minakami | F28D 15/0275 174/16.3 |
| 5,419,041 | A | * | 5/1995 | Ozeki | H01L 23/3677 257/E23.105 |
| 5,447,189 | A | * | 9/1995 | McIntyre | H01L 23/3677 257/E23.105 |
| 5,854,739 | A | * | 12/1998 | Steiner | F21V 29/74 174/16.3 |
| 6,273,186 | B1 | * | 8/2001 | Ognibene | H01L 23/3672 257/722 |

(Continued)

OTHER PUBLICATIONS

Extended European Search Report for EP Application No. 21461527.0 dated Sep. 23, 2021, 5 pages.

*Primary Examiner* — Tho V Duong
(74) *Attorney, Agent, or Firm* — CANTOR COLBURN LLP

(57) ABSTRACT

A pin for a heat exchanger. The pin includes: a monolithic top section; a monolithic bottom section; and a middle section comprising a plurality of spaced apart sub-pins extending between the top section and the bottom section, wherein the plurality of sub-pins define one or more windows for allowing fluid flow through the middle section. Also disclosed is a layer of a heat exchanger including the pin, as well as a heat exchanger including the layer, and a method of making a layer for a heat exchanger.

8 Claims, 6 Drawing Sheets

(56) References Cited

U.S. PATENT DOCUMENTS

| | | | |
|---|---|---|---|
| 6,318,455 B1* | 11/2001 | Nakado | F28F 3/044 |
| | | | 165/DIG. 464 |
| 6,817,405 B2* | 11/2004 | Kamath | H01L 23/3677 |
| | | | 361/689 |
| 10,048,019 B2 | 8/2018 | Karlen et al. | |
| 10,617,035 B2 | 4/2020 | Mayberry et al. | |
| 10,617,065 B2 | 4/2020 | Notaguchi et al. | |
| 10,821,509 B2 | 11/2020 | Manteiga et al. | |
| 2006/0042782 A1* | 3/2006 | Chen | H01L 23/467 |
| | | | 257/E23.099 |
| 2006/0126308 A1* | 6/2006 | Campbell | H01L 23/3677 |
| | | | 257/E23.09 |
| 2017/0356696 A1 | 12/2017 | Zaffetti et al. | |
| 2020/0141656 A1 | 5/2020 | Lewandowski et al. | |
| 2020/0296820 A1 | 9/2020 | Tang et al. | |

* cited by examiner

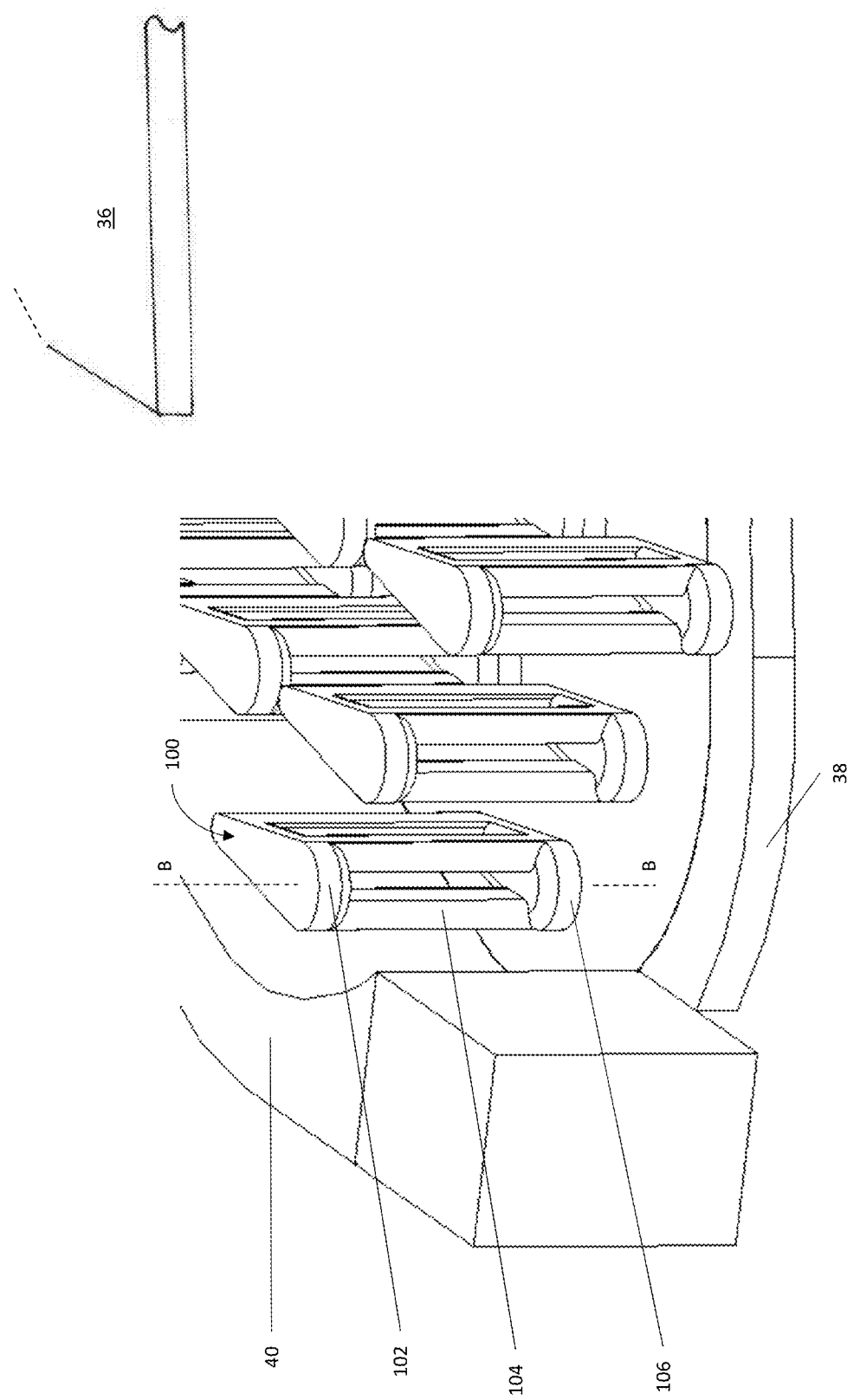

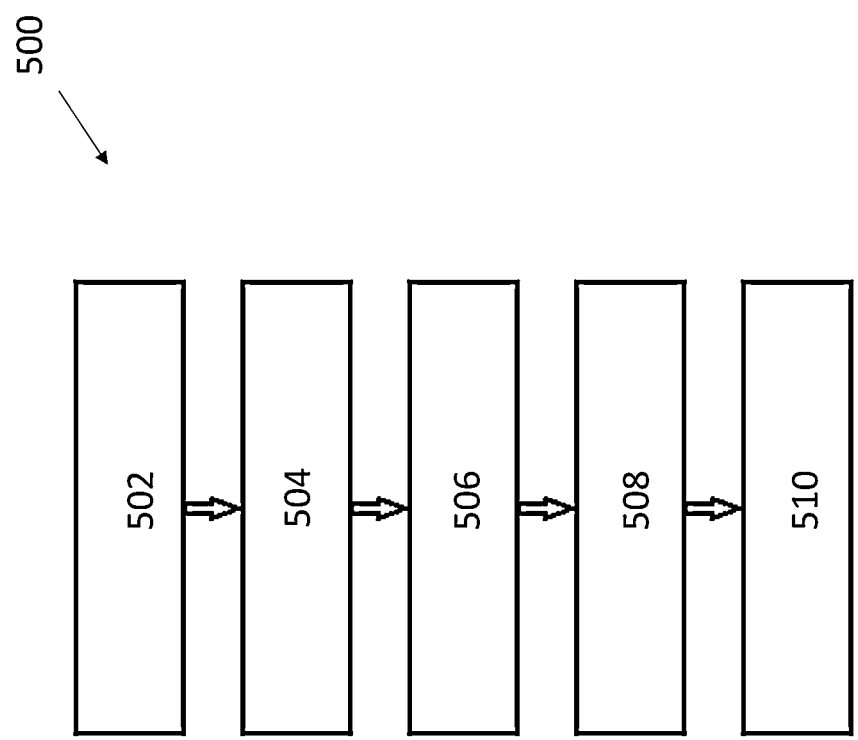

HEAT-EXCHANGER PINS

CROSS-REFERENCE TO RELATED APPLICATIONS

This application claims priority to European Patent Application No. 21461527.0 filed Mar. 26, 2021, the entire contents of which is incorporated herein by reference.

BACKGROUND

The present disclosure relates to a pin for a heat exchanger, a heat exchanger, and a method of making a layer for a heat exchanger.

Many heat exchanger designs have a flowpath defined between an inlet of the heat exchanger and an outlet of the heat exchanger, and between upper and lower plates that extend between the inlet and outlet. Heat exchange to or from a fluid flowing in the flowpath occurs primarily through the upper and lower plates. It is known to provide pins that extend in the flowpath, between the upper and lower plates, to improve the heat transfer. U.S. Pat. No. 10,617,035 US discloses such an arrangement, in which the pins have variable spacing between adjacent pins and/or have variable cross-sectional shapes, in order to affect the heat transfer rate.

Such conventional heat exchangers have generally been considered satisfactory for their intended purpose but there is a need in the art for improved heat exchangers.

BRIEF DESCRIPTION

According to a first aspect, the disclosure provides a pin for a heat exchanger, the pin comprising: a monolithic top section; a monolithic bottom section; and a middle section comprising a plurality of spaced apart sub-pins extending between the top section and the bottom section, wherein the plurality of sub-pins define one or more windows for allowing fluid flow through the middle section.

As the top section and bottom section are both monolithic, fluid will flow around these parts of the pin, while fluid can flow through the middle section, around the sub-pins. The sub-pins may increase the surface area in contact with the fluid. In a heat exchanger, this may increase the heat exchange between the fluid and the pin, compared to a monolithic pin that lacks the present middle section.

The top section and/or bottom section may have a cross-sectional shape that is one of: drop-shaped, airfoil shaped, rectangular, circular, or polygonal.

The shape of the top and/or bottom sections may be chosen to direct fluid flow in a desired manner. Some shapes may help induce turbulence in a fluid flowing past the pin, while other shapes may encourage laminar flow. Alternatively or additionally, the shape of the top and bottom sections may be selected to change a fluid flow direction in a fluid flowing past the pin.

One or more of the sub-pins may have a cross-sectional shape that is one of: drop-shaped, airfoil shaped, rectangular, circular, or polygonal.

The shapes of the sub-pins may be chosen to direct fluid flow in a desired manner. Some shapes may help induce turbulence in a fluid flowing past the pin, while other shapes may encourage laminar flow. Alternatively or additionally, the shapes of the sub-pins may be selected to change a fluid flow direction in a fluid flowing past the pin.

The plurality of sub-pins may consist of three sub-pins, wherein the three sub pins are arranged to define the vertices of an equilateral triangle, a scalene triangle, or an isosceles triangle.

A triangular design may provide greater strength to the overall pin compared to other designs, e.g. designs having two only sub-pins. Further, a triangular design may assist in using the pin to alter a fluid flow direction of fluid flowing past the pin.

The pin may have a pin height, h, and the middle section may have a middle section height, hm, wherein the middle section height is less than the pin height and greater than 50% of the pin height. Optionally, the middle section height may be greater than 75% of the pin height.

The middle section may generally have lower strength compared to the monolithic top and bottom sections. The middle section may therefore introduce a weakness in the overall pin and the amount of weakness is partly determined by the height of the middle section. The amount of weakness introduced should be weighed against the anticipated use of the pin—e.g. based on anticipated fluid pressures and/or fluid compositions of the fluid flowing past the pin.

The pin may be formed from an aluminium alloy, a copper alloy, or an austenitic nickel-chromium-based superalloy.

The material for the pin may be selected based on a number of constraints, including cost, material strength, ease-of-manufacture, thermal conductivity, and corrosion protection.

According to another aspect, there is provided a layer for a heat exchanger. The layer may comprise an inlet; an outlet; an upper sheet; and a lower sheet; wherein a fluid flowpath is defined between the upper and lower sheets and from the inlet to the outlet; wherein at least one pin is disposed in the flowpath. The pin may be a pin according to the previous aspect. The top section of the or each pin may be connected to the upper sheet and the bottom section of the or each pin is connected to the lower sheet.

In this heat exchanger, the pin may assist heat transfer between a fluid flowing in the layer and a region outside the layer. The region outside the layer, with which heat is exchanged, may be another (optionally, similar) layer or may be an environment surrounding the layer, e.g. air.

The or each pin may be oriented within the layer such that one window of the or each pin faces directly into a local flow direction defined immediately ahead of the or each pin, from the inlet to the outlet.

This may encourage non-turbulent flow separation of the fluid flowing into the middle section, as the fluid splits and flows around the sub-pins that (partly) define the window.

The or each pin may comprise three sub-pins, wherein a first and second of the sub-pins define the window that faces directly into the local flow direction, and wherein a third of the sub-pins is located directly behind the window, in the flow direction, such that, in use, a portion of fluid that flows through the window splits in two to flow around both sides of the third sub-pin.

This arrangement may encourage non-turbulent flow separation of the portion of fluid that entered the middle section, via the window, as the fluid splits and flows around the third sub-pin.

The flowpath may be U-shaped, wherein the flowpath extends along a first straight section from the inlet to one or more turning vanes and the flowpath extends along a second straight section from the one or more turning vanes to the outlet, wherein the outlet is adjacent the inlet and separated therefrom by a separation wall.

This may provide a compact design of layer in which fluid entering the layer also exits the layer at a location adjacent the inlet. This may simplify the arrangement or construction of a pipe or header connecting to the inlet and a pipe or header connecting to the outlet.

According to another aspect, there is provided a heat exchanger comprising a first layer and a second layer, wherein the first layer is a layer according to the preceding aspect; wherein the second layer is a layer according to the preceding aspect; and wherein the upper sheet of the second layer is also the lower sheet of the first layer.

This design of heat exchanger may encourage better heat transfer between the layers compared to a design having monolithic pins for heat transfer (i.e. pins lacking the middle section).

According to a further aspect, there is provided an additive-manufacturing method of making a layer for a heat exchanger, the method comprising: additively manufacturing one or more pins on a lower sheet, wherein additively manufacturing the or each pin comprises: additively manufacturing a monolithic bottom section of a pin on a lower sheet, additively manufacturing a plurality of spaced apart sub-pins on the bottom section, the sub-pins extending away from the lower sheet, additively manufacturing a monolithic top section connected to each of the sub-pins; and the method further comprising connecting an upper sheet to the top section of the or each pin.

Using additive manufacturing may help in the construction of the or each pin, particularly the middle section. Further, this helps avoid any need to manually handle the or each pin to adhere them to the lower sheet, as the pin(s) is/are constructed directly on the lower sheet. This may also help improve accuracy in the placement and orientation of the pins within the heat exchanger compared to traditional (non-additive) manufacturing methods.

The method may comprise additively manufacturing a sidewall extending between the lower sheet and the upper sheet; and optionally additively manufacturing one or more sets of turning vanes on the lower sheet at the same time as additively manufacturing the or each pin.

Additively manufacturing the sidewall may be simpler than using traditional manufacturing techniques. Turning vanes may be desirable in layers having a non-straight flow path, e.g. a U-shaped flow path, and additively manufacturing these may be simpler than using traditional (non-additive) manufacturing techniques.

According to another aspect, there is provided a method of additively manufacturing a heat exchanger, the method comprising: additively manufacturing a first plurality of layers interleaved with a second plurality of layers, wherein each layer of the first and second pluralities of layers is manufactured via the method of the preceding aspect; additively manufacturing a first header fluidly connected to each of the first plurality of layers; and additively manufacturing a second header fluidly connected to each of the second plurality of layers.

The heat exchanger constructed in accordance with this aspect may have a compact design allowing for good heat exchange between fluids flowing in their respective pluralities of layers.

Each step of additive manufacturing may be performed using a metal powder bed SLM additive manufacturing process, optionally wherein a powder of the metal powder bed is one of an aluminium alloy, a copper alloy, and an austenitic nickel-chromium-based superalloy.

SLM is a relatively mature additive-manufacturing technology and typically allows recovery of unused (i.e. unmelted) powder from the finished article. The unused powder may be used in future additive-manufacturing operations and thus this method may be cost effective by minimizing wastage of (potentially expensive) metal powder.

BRIEF DESCRIPTION OF THE DRAWINGS

Certain embodiments of the present disclosure will now be described in greater detail by way of example only and with reference to the accompanying drawings in which:

FIG. 3 shows a zoomed-in perspective view of the layer of FIG. 2;

FIG. 5 shows a method of making a heat exchanger.

DETAILED DESCRIPTION

Figure 1:
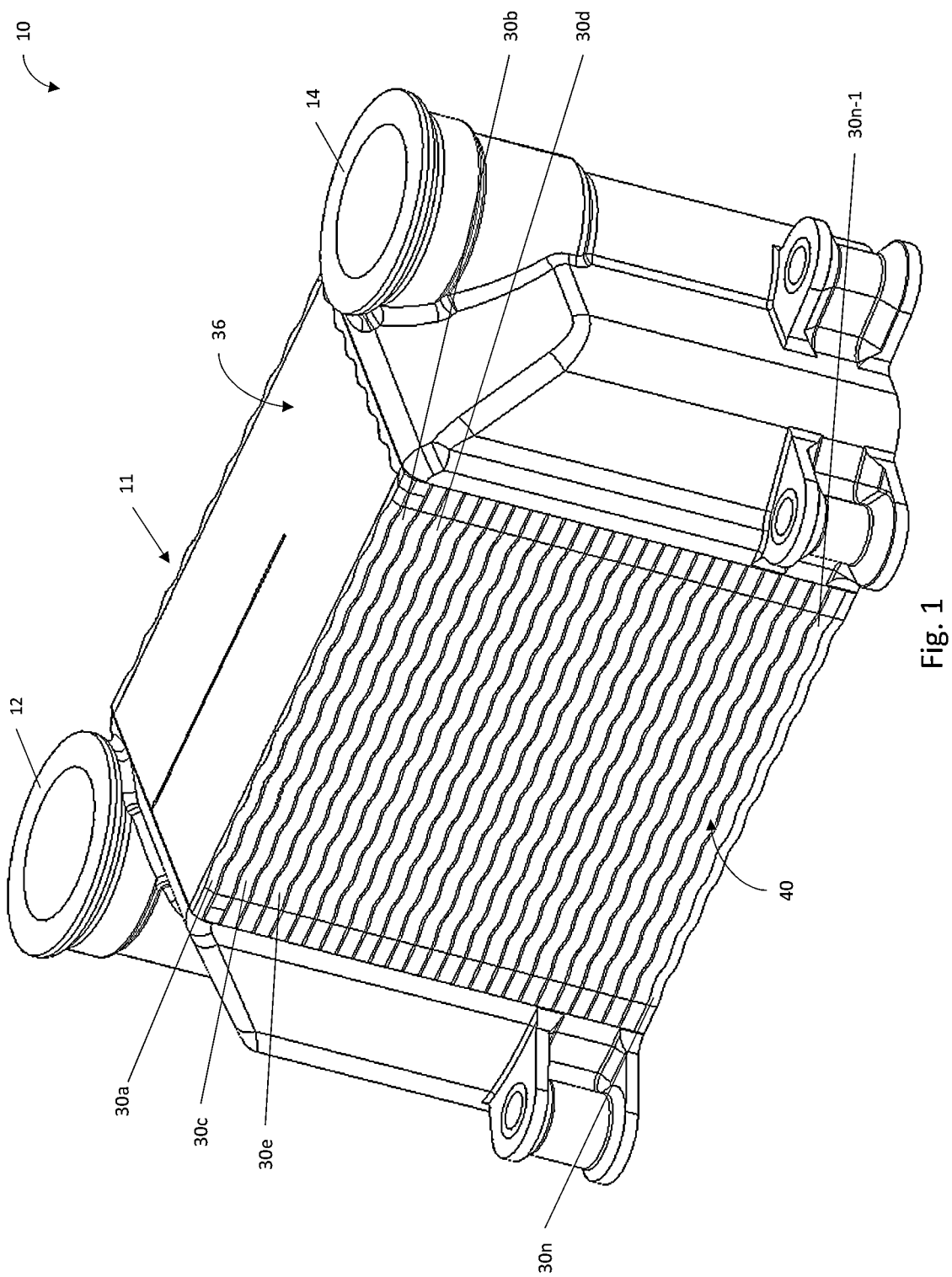
FIG. 1 shows a perspective view of a heat exchanger.

FIG. 1 shows a heat exchanger 10 having a heat exchanger core 11, a first header 12 for conveying a first fluid into and out of the core 11, and a second header 14 for conveying a second fluid into and out of the core 11. The heat exchanger may be primarily used to exchange heat between the first fluid and the second fluid. However, heat may also be exchanged out through the sidewall 40 as well as out of the top and bottom sides of the heat exchanger core 11.

The first header 12 connects to a first plurality of layers 30a,c,e, . . . 30n of the heat exchanger core 11. The second header 14 connects to a second plurality of layers 30b,d, . . . 30n−1 of the heat exchanger core 11. The first plurality of layers 30a,c,e . . . 30n is interleaved with the second plurality of layers 30b,d . . . 30n−1 such that for example, layer 30b is located between layers 30a and 30c. At least within the heat exchanger 10, the first fluid flowing in the first plurality of layers 30a,c,e . . . 30n is fluidly isolated from the second fluid flowing in the second plurality of layers 30b,d . . . 30n−1.These layers may be generically referred to by reference numeral 30 and any layer of the first and second pluralities of layers may be a layer 30 as shown in FIG. 2.

Figure 2:
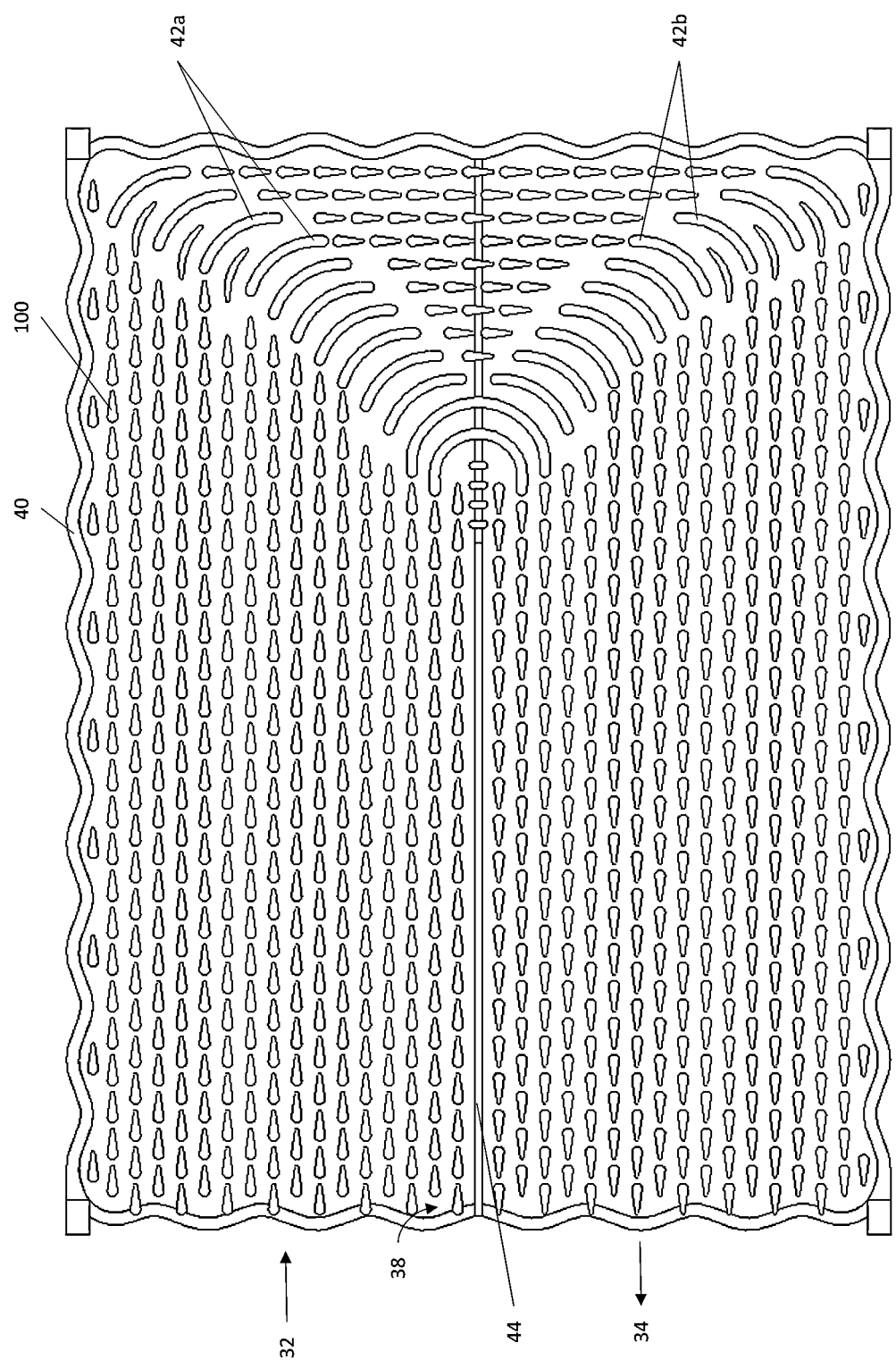
FIG. 2 shows a plan view of a layer within the heat exchanger.

As shown in FIGS. 2 and 3, the layer 30 comprises an inlet 32 and an outlet 34, and upper sheet 36, a lower sheet 38, and a sidewall 40. In use, fluid is constrained by the upper sheet 36, lower sheet 38, and sidewall 40, so as to flow from the inlet 32, through the layer 30, to the outlet 34. That is, the upper sheet 36, lower sheet 38, and sidewall 40 together define a flowpath for fluid flowing in the layer 30. In FIG. 3, the upper sheet 36 has been moved away from the pins 100 and sidewall 40, in order to better show the features internal to the layer. In use, the upper sheet 36 sits atop the pins 100 and sidewall. Further, the upper sheet 36 of a given layer (e.g. layer 30b), may simultaneously function as the lower sheet 38 of layer (e.g. layer 30a) immediately above.

FIG. 3 shows a plurality of the pins 100 in perspective view. Each of the pins 100 is located in the fluid flowpath within the layer 30 and each pin 100 extends between the upper sheet 36 and lower sheet 38.

As shown in FIG. 3, the pin 100 comprises a top section 102, a middle section 104, and a bottom section 106. The top section 102 connects to the upper sheet 36 (which is removed in FIG. 3, to better shown the pins 100) and the bottom section 104 connects to the lower sheet 38. The middle section 104 connects between the top 102 and bottom sections 106. Thus, the pin 100 defines an axis B that extends from the top section 102, through the middle section 104, to the bottom section 106.

Figure 4A:
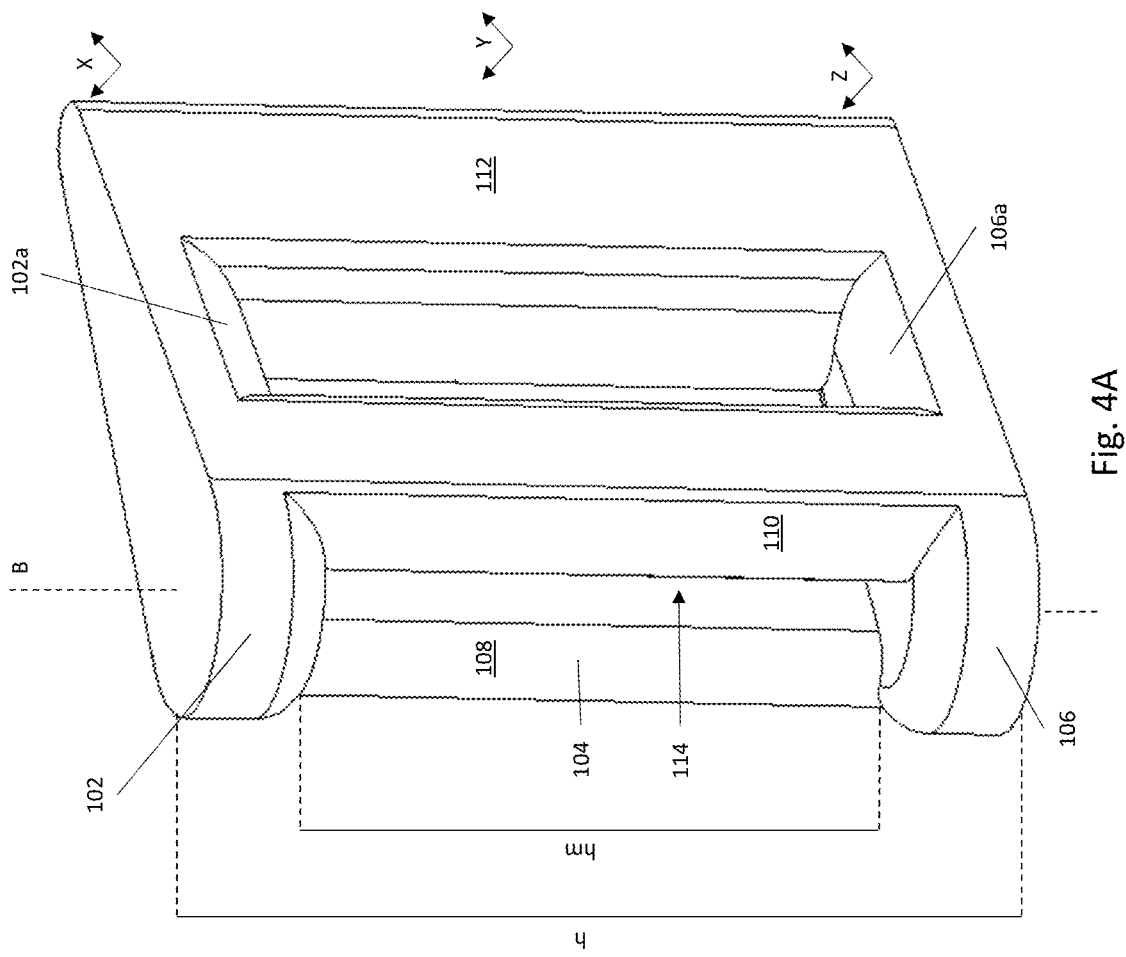
FIG. 4A shows a perspective view of a pin for use in the heat exchanger.

As shown in FIG. 4A, the axis B extends normal to a first plane X, and the top section 102 extends generally within the first plane X.

The axis B also extends normal to a second plane Y, and the middle section 104 extends generally within the second plane Y.

The axis B also extends normal to a third plane Z, and the bottom section 106 extends generally within the third plane Z. Thus, the first plane X, second plane Y, and third plane Z are each parallel to one another and spaced apart from one another along the axis B.

The top section 102 is monolithic. That is, it is a single unit, impermeable to fluid.

The bottom section 106 is monolithic. That is, it is a single unit, impermeable to fluid.

The middle section comprises a plurality of sub-pins 108,110,112 that each respectively connect to the top section 102 and to the bottom section 106. The sub-pins 108,110,112 are spaced apart from one another such that fluid flowing in the second plane Y may flow between the sub-pins 108,110, 112, i.e. may flow through the middle section 104.

The top section 102 is monolithic such that fluid flowing in the first plane X must flow around the top section 102, either by flowing around the top section 102 generally within the plane X or by flowing down towards the second plane Y and then between the sub-pins 108,110,112.

The bottom section 106 is monolithic such that fluid flowing in the third plane Z must flow around the bottom section 106, either by flowing around the bottom section 106 generally within the plane Z or by flowing up towards the second plane Y and then between the sub-pins 108,110,112.

Figure 4B:
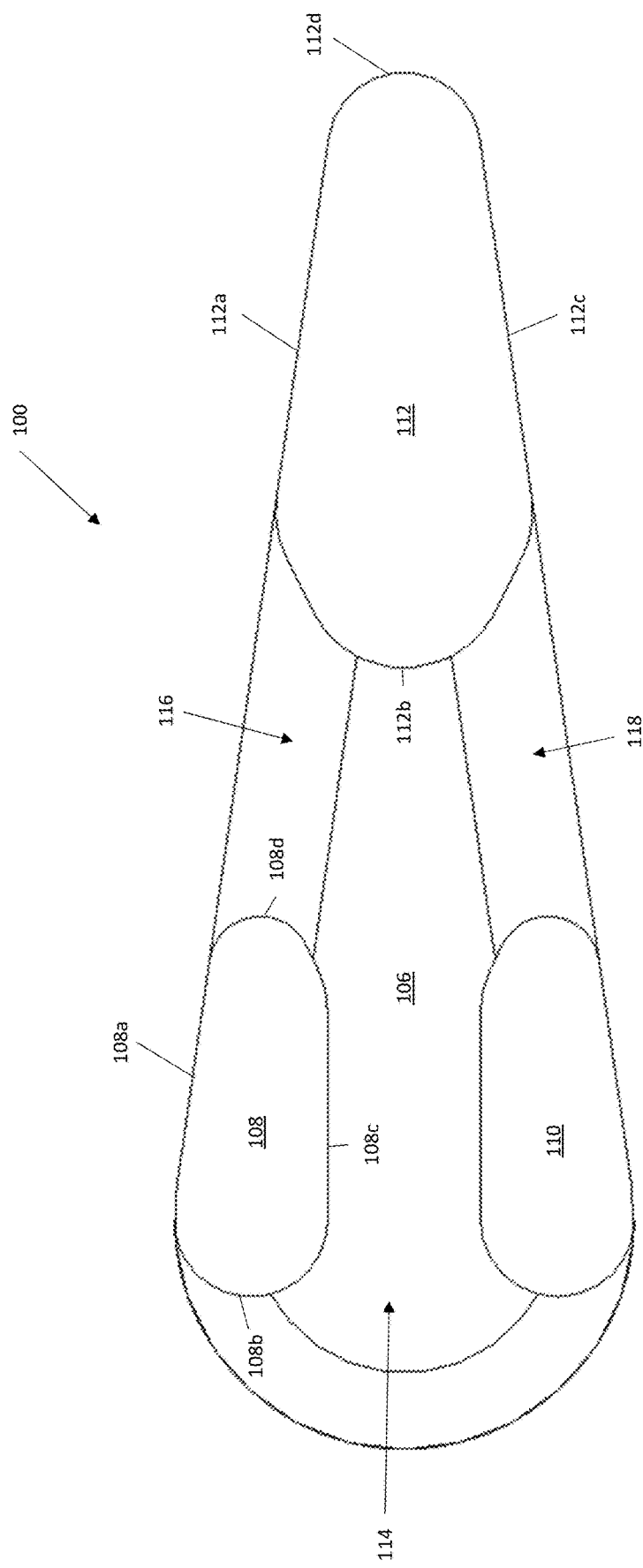
FIG. 4B shows a plan view of the pin of FIG. 4A.

In the embodiment shown in FIGS. 4A and 4B, there are three sub-pins 108,110,112 of the middle section 104. However, in other embodiments (not shown) there may be two or more sub-pins, i.e. there are always at least two sub-pins and the pin 100 is not limited to having exactly three sub-pins.

FIG. 4A shows a single pin 100 and FIG. 4B shows a cross-section through the second plane Y, looking along axis B towards the bottom section 106. In the middle section 104:

A first window 114 is defined at its top by the top section 102, and at its bottom by the bottom section 106, and at its sides by the first 108 and the second 110 of the sub-pins.

A second window 116 is defined at its top by the top section 102, and at its bottom by the bottom section 106, and at its sides by the first 108 and third 112 of the sub-pins.

A third window 118 is defined at its top by the top section 102, and at its bottom by the bottom section 106 and at its sides by the second 110 and third 112 of the sub-pins.

In use, fluid may flow through the windows 114,116,118, which is another way of saying that fluid may flow around and between the sub-pins 108,110,112. The use of sub-pins may increase the surface area of the middle section 104 compared to the top or bottom sections 102,106, which may increase the heat-transfer efficiency of the overall pin 100 as well as the pressure drop across the layer 30. The top and bottom sections 102,106 may provide a stronger connection to the upper and lower sheets 36,38, respectively, compared to connecting the sub-pins directly to the sheets 36,38.

The top section 102 and bottom section 106 may each have a chamfered edge 102a,106a where they meet the middle section 104, to encourage laminar fluid flow.

As shown in FIG. 4B, the sub-pins 108,110,112 may have an elongate cross-section (i.e. cross-section defined in the second plane Y). For example, in the case of the first sub-pin 108, the cross-section may be defined by two straight sides 108a,c that are joined at their ends by two curved sides 108b,d.

Similarly, the second sub-pin 110 may have a cross-section defined by two straight sides that are joined at their ends by two curved sides.

The first and second sub-pins may have identical cross-sectional shapes and sizes.

The third sub-pin 112 may have a cross-section defined by two straight sides 112a,c that are joined at their ends by two curved sides 112b,d.

The third sub-pin 112 may have the same cross-sectional shape and size as the first and/or second sub-pins 108,110 or it may have a different cross-sectional shape.

In other embodiments (not shown) any of the sub-pins may have any cross-sectional shape, as desired. For example, one or more sub-pins may have a cross-section that is circular, elliptical, square, rectangular, triangular, hexagonal, or any other shape as desired.

The cross-sectional shape of a given sub-pin may be chosen to assist with fluid flow in any desired manner. For example, some shapes may encourage turbulence in the fluid flow while other shapes may encourage laminar fluid flow around the sub-pins.

Whether a given shape encourages laminar or turbulent flow additionally depends on the fluid used in the layer and the Reynolds number of the flow. Thus, the choice of shape will additionally depend on the choice of fluid (e.g. liquid vs gas; oil, water, air, $CO_2$ etc.) as well as the expected flow rate through the core 11.

The top section 102 may have a cross-section that is drop-shaped, as shown in FIG. 4. This is a shape having a generally triangular shape except that one side of the triangle curves outwards, while the end opposite this curved side tapers to a point or to a thin, rounded end.

The bottom section 106 may have a cross-section that is drop-shaped, as shown in FIG. 4. This is a shape having a generally triangular shape except that one side of the triangle curves outwards, while the end opposite this curved side tapers to a point or to a thin, rounded end.

The top and bottom sections 102,106 may have identical cross-sectional shapes and sizes. Alternatively, they may have different shapes and sizes.

For example, either or both of the top and bottom sections can have any of: an airfoil shape, a rectangular shape, a triangular shape, a circular shape, a hexagonal shape, etc. as desired. Some cross-sectional shapes may encourage turbulence in the fluid flow while others may encourage laminar flow. The shapes of the top and bottom sections 102,106 may be selected as desired for a given application.

In the embodiment shown, each pin 100 has drop-shaped top section 102, a drop-shaped bottom section 106, and three sub-pins 108,110,112 in the middle section 104. The sub-pins are arranged such that the third sub-pin 112 extends between the tapered end of the drop shape of the top section 102 and the tapered end of the drop shape of the bottom section 106. The first 108 and second 110 sub-pins may be arranged symmetrically, at either end of the curved side of the drop-shape of both the top and bottom sections. In this manner, the first 108, second 110, and third 112 sub-pins define the corners of an isosceles triangle. The sub-pins may instead be spaced to define the corners of an equilateral triangle or a scalene triangle. The size and placement of the sub-pins will help define the size and orientation of the windows in the middle section. The size and orientation of the windows can be selected to modify the direction of a fluid flow past the pin. Similarly, the cross-sectional shapes of the sub-pins may also assist in modifying the direction of fluid flow past the pin.

The layer 30 shown in FIG. 2 defines a generally U-shaped flowpath between the inlet 32 and outlet 34. A first portion of the first header 12 connects to the inlet side 30 of each layer 30a,c,e . . . n of the first plurality of layers, and, in use, fluid is pumped into the first portion and flows into the inlet side 32 of every layer connected to the first header 12. The fluid flows through each of the layers 30a,c,e . . . n and out through the outlet 34 of each layer of the first plurality of layers. The outlets 34 are all connected to a second portion of the first header 12, the second portion being fluidly isolated from the first portion. Fluid flows into the second portion and then out of the first header 12.

Similarly, a first portion of the second header 14 connects to the inlet side 30 of each layer 30b,d . . . n−1 and, in use, fluid is pumped into the first portion and flows into the inlet side 32 of every layer connected to the second header 14. The fluid flows through each of the layers 30a,c,e, . . . n and out through the outlet 34 of each layer. The outlets 34 are all connected to the second portion of the second header 14, the second portion being fluidly isolated from the first portion. Fluid flows into the second portion and then out of the second header 14.

Within each layer 30, a first set of turning vanes 42a may turn the flow through 90 degrees, and a second set of turning vanes 42b may turn the flow through a further 90 degrees, to create the overall U-shaped flow path. A plurality of pins 100 may be disposed between the first and second sets of turning vanes 42a,b.

The pins 100 shown in FIG. 3 are all arranged within the layer 30 such that the window 114 of each pin 100 faces directly into a local flow direction. That is, for each pin 100, the flow direction of fluid immediately in front of the pin 100 is normal to the plane of the window 114. In this manner, fluid flows through the window 114 (which, as before, is defined between the top and bottom sections 102,106 and the first and second sub-pins 108,110) and towards the third sub-pin 112.

With reference to FIG. 4B, fluid flowing into the middle section 116, through the window 114, may then be split when it impinges upon the third sub-pin 112 and the split portions of the fluid will then flow through the second 116 and third 118 windows, around the third sub-pin 112.

The third sub-pin 112 may have a tapering shape, e.g. a drop-shape, to encourage laminar flow in the region beyond the third sub-pin.

Therefore, as shown in FIG. 2, the fluid in layer 30 may flow in through the inlet 32 and along a first straight section past a plurality of pins 100, towards the first set 42a of turning vanes. The fluid may then be turned 90 degrees and flow past another plurality of pins 100 (each oriented such that its window 114 faces directly into the oncoming flow), towards the second set 42b of turning vanes. The fluid may then flow along another straight section past a further plurality of pins 100 (each oriented such that its window 114 faces directly into the oncoming flow) and out through the outlet 34. Alternatively or additionally, a turning vane may turn the fluid flow 180 degrees.

A separation wall 44 may extend from a point between the inlet 32 and outlet 34, to a point near the sets of turning vanes 42a,42b, to further define the U-shaped flowpath.

A height h of a pin 100 may be defined along the axis B, and the height h is the sum of the height of the top section 102, the height hm of the middle section 104, and the height of the bottom section 106. The height hm of the middle section may be, for example, greater than 50% of the overall pin height h, or may be greater than 75% of the pin height h, or greater than 90% of the pin height h. The height of the middle section hm is less than 100% of the height h of the pin (otherwise the top 102 and bottom sections 106 would not exist).

The middle section 104 contains less material, viewed in cross-sectional plane Y, than either the top section 102 or the bottom section 106. This typically means that the middle section 104 introduces a weak point in the pin 100, i.e. a region in which pin breakage is more likely to occur. The height hm of the middle section 104 may be selected to balance the desired heat-transfer and pressure-drop characteristics against the need for strength of the overall pin 100. That is, for a stronger overall pin 100, the height hm of the middle section 104 may be kept smaller as a fraction of the overall height h. Alternatively or additionally, the cross-sectional sizes and/or material of the sub-pins 108,110,112 may be selected to determine a desired strength of the middle section 104.

The top section 102 and bottom section 106 both provide strength to the overall pin 100 and provide a larger area, compared to the sub-pins, to connect the pin 100 to the upper sheet 36 and lower sheet 38.

The pin 100 may be produced by additive manufacturing, such as by the process shown in FIG. 5. In the method 500, a lower sheet 38 is provided (step 502), optionally by additive manufacturing the lower sheet. At step 504, the bottom section 106 of a pin 100 is additively manufactured to the lower sheet. At step 506, the sub-pins (e.g. sub-pins 108,110,112) of the middle section 104 are additively manufactured on the bottom section 106, such that the sub-pins extend away from the lower sheet 38. At step 508, the top section 102 of the pin 100 is additively manufactured on the sub-pins. At step 510, an upper sheet is connected to the pin 100, optionally by additively manufacturing the upper sheet 36. The process may optionally include additively manufacturing one or more of: the sidewall 40, turning vanes 42a,b, further layers 30 on top of the initially formed layer 30, and one or more headers connecting to the or each layer 30.

The pin 100 may be produced by a SLM powder-bed method of additive manufacturing. In this method, a first layer of metal powder is provided and a portion of the powder is melted by a laser beam to "print" the first layer of the overall object. The first layer is then lowered and a second layer of powder is brushed over the first layer, and a portion of the second layer of powder is melted by the laser beam to print a second layer of the overall object. In this way, a three-dimensional object is built-up layer-by-layer and, once all layers of the object have been printed, the loose (i.e. unmelted) powder is removed to reveal the object.

The one or more pins 100 may be printed onto a pre-existing sheet of material that forms the lower sheet 38. Alternatively, the lower sheet 38 itself may be formed by additive manufacturing and, after the lower sheet 38 is formed, the pin(s) 100 may be formed on the lower sheet 38 by continuing the additive manufacturing process.

Similarly, the upper sheet 38 may be a pre-existing layer that is connected to the top sections 102 of the pins 100 after construction of the pins 100 on the lower sheet 38. Alternatively, the upper sheet 38 may be additively manufactured after the pins 100 have been manufactured, by continuing the additive manufacturing process.

After a first layer 30 (e.g. layer 30n) of the heat exchanger core 11 is formed, a new layer 30 (e.g. layer 30n−1) may be formed directly on top of the first layer 30. In this case, the upper sheet 36 of the first layer 30 becomes the bottom sheet 38 of the new layer 30. That is, the same layer of material may simultaneously function as the upper sheet 36 of one layer 30, and the bottom sheet 38 of another layer 30.

The sidewall 40 may have an undulating cross-section, e.g. as shown in FIGS. 1 and 2. This may increase the heat transfer across the sidewall 40 and/or may increase the strength of the sidewall for a given wall thickness.

Any or all parts of the heat exchanger 10 may be made from metal. In some embodiments, some or all parts are made from an austenitic nickel-chromium-based superalloy, such as the Iconel family of metals manufactured by the Special Metals Corporation of New York state, USA. In other embodiments, some or all parts may be made from an aluminium alloy or a copper alloy.

The first and second fluids may be oil, such that the heat exchanger 10 is an oil-oil heat exchanger. However, in other embodiments, the first fluid may be different from the second fluid. Other fluids, including air, water, or carbon dioxide are also envisaged for either or both of the first and second fluids.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pin for a heat exchanger, the pin comprising:
a monolithic top section;
a monolithic bottom section; and
a middle section comprising a plurality of spaced apart sub-pins extending between the top section and the bottom section, wherein the plurality of sub-pins define one or more windows for allowing fluid flow through the middle section;
wherein the plurality of sub-pins consists of three sub-pins, wherein the three sub pins are arranged to define the vertices of an equilateral triangle, a scalene triangle, or an isosceles triangle.

2. The pin according to claim 1, wherein the top section and/or bottom section has a cross-sectional shape that is one of: drop-shaped, airfoil shaped, rectangular, circular, or polygonal.

3. The pin according to claim 1, wherein one or more of the sub-pins has a cross-sectional shape that is one of: drop-shaped, airfoil shaped, rectangular, circular, or polygonal.

4. The pin according to claim 1, wherein the pin has a pin height (h) and the middle section has a middle section height (hm), wherein the middle section height (hm) is less than the pin height (h) and greater than 50% of the pin height (h).

5. The pin according to claim 1, wherein the pin is formed from an aluminium alloy, a copper alloy, or an austenitic nickel-chromium-based superalloy.

6. A layer for a heat exchanger, the layer comprising:
an inlet;
an outlet;
an upper sheet; and
a lower sheet;
wherein a fluid flowpath is defined between the upper and lower sheets and from the inlet to the outlet;
wherein at least one pin is disposed in the flowpath, wherein the top section of the at least one or each pin is connected to the upper sheet and the bottom section of the or each pin is connected to the lower sheet;
wherein each pin includes:
a monolithic top section; a monolithic bottom section; and
a middle section comprising a plurality of spaced apart sub-pins extending between the top section and the bottom section, wherein the plurality of sub-pins define one or more windows for allowing fluid flow through the middle section;
wherein the at least one pin is oriented within the layer such that one window of the or each pin faces directly into a local flow direction defined immediately ahead of the at least one pin, from the inlet to the outlet;
wherein the at least one pin comprises three sub-pins, wherein a first and second of the sub-pins define the window that faces directly into the local flow direction, and wherein a third of the sub-pins is located directly behind the window, in the flow direction, such that, in use, a portion of fluid that flows through the window splits in two to flow around both sides of the third sub-pin.

7. The layer according to claim 6, wherein the flowpath is U-shaped;
wherein the flowpath extends along a first straight section from the inlet to one or more turning vanes and the flowpath extends along a second straight section from the one or more turning vanes to the outlet, wherein the outlet is adjacent the inlet and separated therefrom by a separation wall.

8. A heat exchanger comprising:
a first layer according to claim 6; and
a second layer;
wherein an upper sheet of the second layer is also the lower sheet of the first layer.

* * * * *